United States Patent
Park

(10) Patent No.: US 8,314,171 B2
(45) Date of Patent: Nov. 20, 2012

(54) COATING SOLUTION FOR INKJET RECORDING APPARATUS, INK SET INCLUDING THE COATING SOLUTION AND INK COMPOSITION, AND INK JET RECORDING APPARATUS INCLUDING THE INK SET

(75) Inventor: Sung-Hui Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 227 days.

(21) Appl. No.: 12/694,853

(22) Filed: Jan. 27, 2010

(65) Prior Publication Data

US 2011/0054097 A1     Mar. 3, 2011

(30) Foreign Application Priority Data

Aug. 25, 2009   (KR) ......................... 10-2009-0078848

(51) Int. Cl.
*C08K 5/20*      (2006.01)
*C08K 3/16*      (2006.01)
(52) U.S. Cl. ......... 524/201; 524/612; 524/401; 524/429
(58) Field of Classification Search ................. 524/201, 524/612, 401, 429
See application file for complete search history.

(56) References Cited

U.S. PATENT DOCUMENTS

| 4,207,577 A * | 6/1980 | Mansukhani ................. 347/101 |
| 2008/0081203 A1 * | 4/2008 | Knight et al. ................. 428/480 |

* cited by examiner

*Primary Examiner* — Robert D. Harlan
(74) *Attorney, Agent, or Firm* — Staas & Halsey LLP

(57) ABSTRACT

The present disclosure provides a coating solution for an inkjet recording apparatus including a non-ionic polymer, a monovalent metal salt and a water-soluble organic solvent; an ink set including the coating solution and an ink composition; and an inkjet recording apparatus including the ink set.

17 Claims, 1 Drawing Sheet

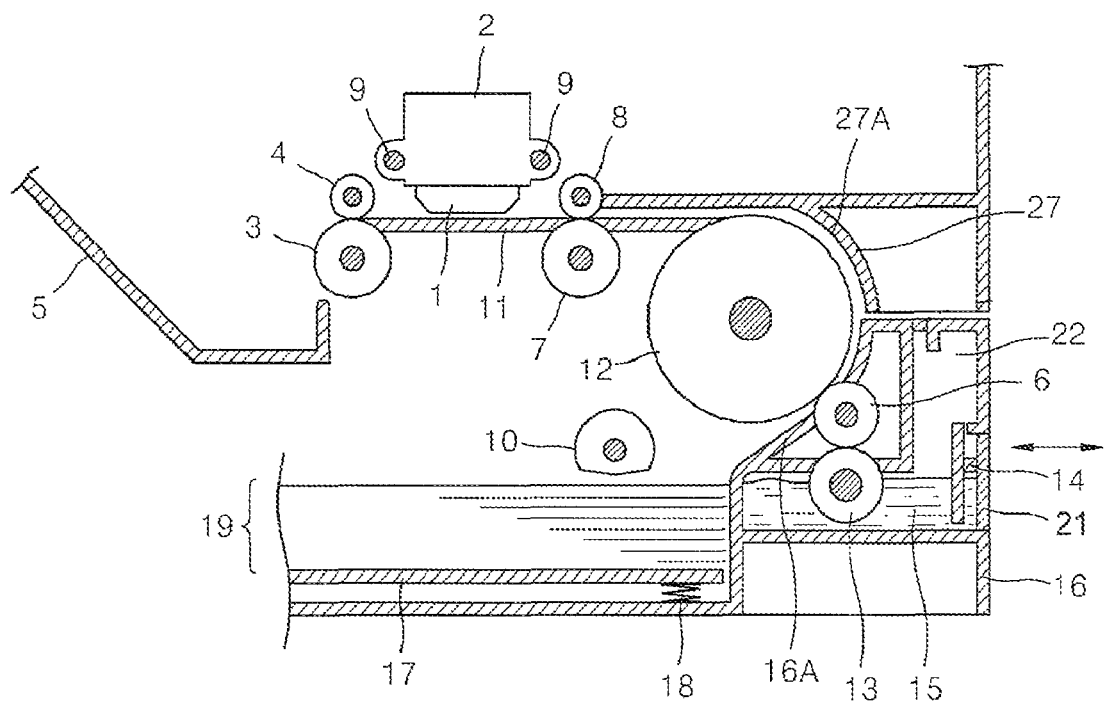

COATING SOLUTION FOR INKJET RECORDING APPARATUS, INK SET INCLUDING THE COATING SOLUTION AND INK COMPOSITION, AND INK JET RECORDING APPARATUS INCLUDING THE INK SET

CROSS-REFERENCE TO RELATED PATENT APPLICATION

This application claims the benefit of Korean Patent Application No. 10-2009-0078848, filed on Aug. 25, 2009, in the Korean Intellectual Property Office, the disclosure of which is hereby incorporated by reference in its entirety for all purposes.

TECHNICAL FIELD

The present disclosure relates generally to coating solutions for an inkjet recording apparatus, an ink set including the coating solutions for the inkjet recording apparatus and ink compositions, and an inkjet recording apparatus including the ink set.

BACKGROUND OF RELATED ART

In inkjet printing methods, an image is printed by ejecting ink droplets onto selective locations of a printing medium such as, for example, a sheet of paper. Inkjet printing methods are widely used because high resolution and high quality images can be obtained using a relatively simple approach. However, the demands for a technique for obtaining higher optical concentration and higher image quality are continually increasing. Several conventional techniques for higher optical concentration and higher image quality are described below.

One conventional technique uses black ink that agglomerates when reacting with a salt and a color ink. According to this method, when an image is printed, an agglomeration phenomena occurs between the salt and the black and color inks, which provides a high quality image while preventing color bleeding. That is, a good image can be obtained by using two types of inks that have different ionic characteristics, and a salt to induce an agglomeration phenomena between the two inks. The salt used in this case may be a polyvalent metal salt.

Another conventional technique uses a colorless reaction solution instead of a salt in an ink. According to this method, ink consists of a colorant having an opposite charge to that of a salt used in the colorless reaction solution. Ion pairing is induced on the surface of paper during printing so as to cause an agglomeration phenomena. The colorless reaction solution used in this case may include a polyvalent salt and/or a cationic polymer.

As described above with regard to the conventional techniques, due to the fast reaction between ink and a reaction solution having different ionic groups, many ink residues remain on the surface of paper which leads to the formation of high resolution and high quality images. However, since ink is mostly in a liquid state due to the inherent characteristics of inkjet printing, the printing paper curls due to the moisture present in the ink after image printing. That is, a curling phenomena occurs. A reaction solution including a polyvalent metal salt and a cationic polymer alone may not prevent such paper curling.

Accordingly, there is a need in the art to develop an inkjet printing technique for producing high optical concentration and high quality images with reduced curling of the printing medium.

SUMMARY OF THE DISCLOSURE

According to one aspect of the present disclosure, there may be provided a coating solution for an inkjet recording apparatus, wherein the coating solution includes a non-ionic polymer, a monovalent metal salt and a water-soluble organic solvent.

In another aspect, a coating solution for an inkjet recording apparatus may be provided to include a non-ionic polymer, a monovalent metal salt and a water-soluble organic solvent. The non-ionic polymer may include at least one polymer selected from the group consisting of polyacryl amide, polyvinyl pyrrolidone, water-soluble celluloses, polyvinyl methyl ether, polyvinyl acetal, polyvinyl alcohol and polyalkylene glycol.

In yet another aspect, a coating solution for an inkjet recording apparatus may be provided to include a non-ionic polymer, a monovalent metal salt and a water-soluble organic solvent. The monovalent metal salt may include at least one metal salt selected from salts including a monovalent metallic ion and an anionic ion. The monovalent metallic ion may be $Li^{+1}$, $Na^{+1}$, or $K^{+1}$; and the anionic ion is $Cl^{-1}$, $NO^{-3}$, $I^{-1}$, $Br^{-1}$, $ClO^{-3}$, $HCOO^{-1}$, $CH_3COO^{-1}$, $OH^{-1}$, $F^{-1}$, $CO_3^{-2}$, $SO_4^{-2}$, $SO_3^{-2}$, $C_6H_5CO^{-2}$, or $HOC(COO^{-1})(CH_2COO^{-1})_2$.

In even yet another aspect, a coating solution for an inkjet recording apparatus may be provided to include a non-ionic polymer, a monovalent metal salt and a water-soluble organic solvent. The monovalent metal salt may include at least one salt selected from the group consisting of lithium chloride, sodium chloride, potassium chloride, sodium bromide, potassium bromide, sodium iodide, potassium iodide, sodium sulfate, potassium nitride, sodium acetate, potassium hydroxide, sodium citrate, and potassium benzoic acid.

In even still yet another aspect, a coating solution for an inkjet recording apparatus, wherein the coating solution includes a non-ionic polymer; a monovalent metal salt and a water-soluble organic solvent. The water-soluble organic solvent may include at least one solvent selected from the group consisting of an amide-based solvent, a nitrogen-containing solvent and a sulfur-containing solvent.

In another aspect, a coating solution for an inkjet recording apparatus may be provided to include a non-ionic polymer; a monovalent metal salt and a water-soluble organic solvent. The water-soluble organic solvent may include at least one solvent selected from the group consisting of N,N-dimethyl acetamide, N,N-dimethyl formamide, pyrrolidone, N-methyl-2-pyrrolidone, 1,3-dimethyl-2-imidazolidinone, dimethylsulfoxide, diethylsulfoxide, tetramethylenesulfone and sulpholane.

In another aspect, a coating solution for an inkjet recording apparatus may be provided to include a non-ionic polymer, a monovalent metal salt and a water-soluble organic solvent. The amount of the non-ionic polymer is in the range of about 100 to about 1,000 parts by weight. The amount of the monovalent metal salt is in the range of about 10 to about 100 parts by weight, based on 100 parts by weight of the water-soluble organic solvent.

In another aspect, a coating solution for an inkjet recording apparatus may be provided to include a non-ionic polymer, a monovalent metal salt and a water-soluble organic solvent. The coating solution may further include a polyvalent metal salt and a cationic polymer.

According to another aspect, a coating solution for an inkjet recording apparatus may include a non-ionic polymer, a monovalent metal salt, and a water-soluble organic solvent. The coating solution may further include a polyvalent metal salt and a cationic polymer. The polyvalent metal salt may include at least one salt selected from salts including a polyvalent metallic ion and an anionic ion, wherein the polyvalent metallic ion is $Ca^{+2}$, $Cu^{+2}$, $Ni^{+2}$, $Mg^{+2}$, $Zn^{+2}$, $Sr^{+2}$, $Ba^{+2}$, $Al^{+3}$, $Fe^{+3}$, $Cr^{+3}$ or $Y^{+3}$; and the anionic ion is $Cl^{-1}$, $NO^{-3}$, $I^{-1}$, $Br^{-1}$, $ClO^{-3}$, $HCOO^{-1}$, $CH_3COO^{-1}$, $OH^{-1}$, $F^{-1}$, $SO_4^{-2}$, $SO_3^{-2}$, $C_6H_5CO^{-2}$, or $HOC(COO^{-1})(CH_2COO^{-1})2$.

In another aspect, a coating solution for an inkjet recording apparatus may be provided to include a non-ionic polymer; a monovalent metal salt and a water-soluble organic solvent. The coating solution may further include a polyvalent metal salt and a cationic polymer. The polyvalent metal salt may be aluminum chloride, aluminum bromide, aluminum sulfate, aluminum nitrate, aluminum acetate, calcium chloride, calcium bromide, calcium iodide, calcium acetate, calcium benzoate, calcium sulfate, copper chloride, copper bromide, copper sulfate, iron chloride, iron bromide, iron iodide, iron sulfate, iron acetate, magnesium chloride, magnesium sulfate, manganese chloride, manganese sulfate, manganese nitrate, nickel chloride, nickel bromide, nickel sulfate, nickel acetate, nickel nitrate, tin sulfate, titanium chloride, zinc chloride, zinc sulfate, zinc nitrate, barium chloride, or barium bromide.

In another aspect, a coating solution for an inkjet recording apparatus may be provided to include a non-ionic polymer a monovalent metal salt and a water-soluble organic solvent, wherein the coating solution further includes a polyvalent metal salt and a cationic polymer. The cationic polymer may include at least polymer selected from the group consisting of polyallylamine, polyamine sulfonate, and polyallylamine salt.

In another aspect, a coating solution for an inkjet recording apparatus may be provided to include a non-ionic polymer, a monovalent metal salt and a water-soluble organic solvent. The coating solution may further include a polyvalent metal salt and a cationic polymer. The amount of the polyvalent metal salt may be in the range of about 50 to about 500 parts by weight. The amount of the cationic polymer may be in the range of about 50 to about 500 parts by weight based on 100 parts by weight of the water-soluble organic solvent.

In another aspect, a coating solution for an inkjet recording apparatus may be provided to includes a non-ionic polymer, a monovalent metal salt and a water-soluble organic solvent. The viscosity of the coating solution may be in the range of about 2.0 to about 19.9 cps at a temperature of 20° C.

In another aspect, there may be provided an ink set including a coating solution for an inkjet recording apparatus and an ink composition. The coating solution may include a non-ionic polymer, a monovalent metal salt and a water-soluble organic solvent.

In another aspect, an ink set including a coating solution for an inkjet recording apparatus and an ink composition may be provided. The coating solution may include a non-ionic polymer, a monovalent metal salt and a water-soluble organic solvent. The ink composition may include about 1 to about 20 parts by weight of a colorant and about 80 to about 99 parts by weight of a solvent.

In another aspect, an ink set including a coating solution for an inkjet recording apparatus and an ink composition may be provided. The coating solution may include a non-ionic polymer, a monovalent metal salt and a water-soluble organic solvent. The ink composition may includes about 1 to about 20 parts by weight of a colorant and about 80 to about 99 parts by weight of a solvent. The solvent may include water alone; or water and at least one organic solvent selected from the group consisting of a monovalent alcohol-based solvent, a ketone-based solvent, an ester-based solvent, a polyhydric alcohol-based solvent, a nitrogen-containing solvent and a sulfur-containing solvent.

In another aspect, there may be provides an ink set including a coating solution for an inkjet recording apparatus and an ink composition. The coating solution may include a non-ionic polymer, a monovalent metal salt and a water-soluble organic solvent. The surface tension of the ink composition may be in the range of about 15 to about 70 dyne/cm. The viscosity of the ink composition may be in the range of about 1 to about 20 cps at a temperature of 20° C.

In another aspect, an inkjet recording apparatus may be provided to include an ink set that includes a coating solution and an ink composition. The coating solution may include a non-ionic polymer, a monovalent metal salt and a water-soluble organic solvent.

BRIEF DESCRIPTION OF THE DRAWINGS

Various features and advantages of the present disclosure will become more apparent by describing in detail several embodiments thereof with reference to the attached drawings, in which:

FIG. 1 is a schematic cross-sectional view of an inkjet recording apparatus according to an embodiment of the present disclosure.

DETAILED DESCRIPTION OF SEVERAL EMBODIMENTS

The present disclosure will now be described more fully with reference to several embodiments and to the accompanying drawings.

According to one aspect of the present disclosure, a coating solution for an inkjet recording apparatus may include a non-ionic polymer, a monovalent metal salt and a water-soluble organic solvent.

The disclosed inkjet recording apparatus including the coating solution may produce a printed image having high resistance to water, light, and/or abrasion, enable a high optical concentration, and may reduce curling of the printing medium after printing.

The disclosed non-ionic polymer may constitute a binder resin for improving bonding between a colorant agglomerate and a printing medium such as, e.g., paper, and bonding between colorant agglomerates, in order to improve friction resistance.

The disclosed non-ionic polymer may be any material that has the characteristics as described above. The non-ionic polymer may include at least one polymer selected from the group consisting of polyacryl amide, polyvinyl pyrrolidone, water-soluble celluloses such as carboxymethyl cellulose, hydroxymethyl cellulose, or hydroxypropyl cellulose, polyvinyl methyl ether, polyvinyl acetal, polyvinyl alcohol, and polyalkylene glycol such as polyethylene glycol or polypropylene glycol, and the like.

The amount of the non-ionic polymer may be, for example, in the range of about 100 to about 1,000 parts by weight, or about 200 to about 700 parts by weight, or about 250 to about 550 parts by weight, based on 100 parts by weight of the water-soluble organic solvent. If the amount of the non-ionic polymer is in the range of about 100 to about 1,000 parts by weight based on 100 parts by weight of the water-soluble organic solvent, the printed image may have high resistance to abrasion and high fixability, and thus, high image quality may be obtained and the viscosity of the coating solution may be appropriately controlled.

The disclosed monovalent metal salt may include a monovalent metallic ion and an anionic ion. The monovalent metallic ion may be, for example, $Li^{+1}$, $Na^{+1}$, or $K^{+1}$. The anionic ion may be, for example, $Cl^{-1}$, $NO^{-3}$, $I^{-1}$, $Br^{-1}$, $ClO^{-3}$, $HCOO^{-1}$, $CH_3COO^{-1}$, $OH^{-1}$, F—, $CO_3^{-2}$, $SO_4^{-2}$, $SO_3^{-2}$, $C_6H_5CO^{-2}$, or $HOC(COO^{-1})(CH_2COO^{-1})_2$.

Examples of monovalent metal salts may include, but are not limited to, lithium chloride, sodium chloride, potassium chloride, sodium bromide, potassium bromide, sodium iodide, potassium iodide, sodium sulfate, potassium nitride, sodium acetate, potassium hydroxide, sodium citrate, potassium benzoic acid, and the like. These monovalent metal salts may be used alone or in combination.

The amount of the monovalent metal salt may be, for example, in the range of about 10 to about 100 parts by weight, or about 15 to about 70 parts by weight, or about 20 to about 50 parts by weight, based on 100 parts by weight of the water-soluble organic solvent. If the amount of the monovalent metal salt is within this range, the monovalent metal salt may not precipitate and thus, a stable coating solution may be obtained. In general, during printing, hydrogen bonds in a printing medium are broken by moisture in the ink. Later, re-bonding occurs randomly on drying. However, if the amount of the monovalent metal salt is within this range, re-bonding may be hindered, and, as a result, the curling phenomenon may be reduced.

The disclosed water-soluble organic solvent may be an amide-based solvent, a nitrogen-containing solvent, or a sulfur-containing solvent. The amide-based solvent may be, for example, N,N-dimethyl acetamide or N,N-dimethyl formamide. The nitrogen-containing solvent may be, for example, pyrrolidone, N-methyl-2-pyrrolidone, or 1,3-dimethyl-2-imidazolidinone. The sulfur-containing solvent may be, for example, dimethylsulfoxide, diethylsulfoxide, tetramethylenesulfone, or sulpholane. These solvents may be used alone or in combination.

The water-soluble organic solvent may prevent the drying of the coating solution, and may also be used together with the monovalent metal salt so as to form a hydrogen bond with the monovalent metal salt in the coating solution, thereby effectively preventing curling of the printing medium.

According to another aspect of the present disclosure, a coating solution for an inkjet recording apparatus may further include water. The amount of the water may be, for example, in the range of about 1,000 to about 3,000 parts by weight, or about 1,500 to about 2,500 parts by weight, or about 1,700 to about 2,300 parts by weight, based on 100 parts by weight of the water-soluble organic solvent. If the amount of water is within the above range, the viscosity of the coating solution may be appropriately controlled, and, thus, the coating solution may be more easily applied.

According to another aspect of the present disclosure, a coating solution for an inkjet recording apparatus may further include a polyvalent metal salt and a cationic polymer in addition to the non-ionic polymer, the monovalent metal salt and the water-soluble organic solvent.

The polyvalent metal salt may include a polyvalent metallic ion and an anionic ion that bonds to the polyvalent metallic ion. The polyvalent metallic ion may be selected from the group consisting of $Ca^{+2}$, $Cu^{+2}$, $Ni^{+2}$, $Mg^{+2}$, $Zn^{+2}$, $Sr^{+2}$, $Ba^{+2}$, $Al^{+3}$, $Fe^{+3}$, $Cr^{+3}$, and $Y^{+3}$. The anionic ion may be selected from the group consisting of $Cl^{-1}$, $NO^{-3}$, $I^{-1}$, $Br^{-1}$, $ClO^{-3}$, $HCOO^{-1}$, $CH_3COO^{-1}$, $OH^{-1}$, $F^{-1}$, $CO_3^{-2}$, $SO_4^{-2}$, $SO_3^{-2}$, $C_6H_5CO^{-2}$, and $HOC(COO^{-1})(CH2COO^{-1})_2$. Polyvalent metal salts formed using these polyvalent metallic ions and anionic ions may be used alone or in combination.

Examples of polyvalent metal salts may include, but are not limited to, aluminum chloride, aluminum bromide, aluminum sulfate, aluminum nitrate, aluminum acetate, calcium chloride, calcium bromide, calcium iodide, calcium acetate, calcium benzoate, calcium sulfate, copper chloride, copper bromide, copper sulfate, iron chloride, iron bromide, iron iodide, iron sulfate, iron acetate, magnesium chloride, magnesium sulfate, manganese chloride, manganese sulfate, manganese nitrate, nickel chloride, nickel bromide, nickel sulfate, nickel acetate, nickel nitrate, tin sulfate, titanium chloride, zinc chloride, zinc sulfate, zinc nitrate, barium chloride, barium bromide, and the like.

The amount of the polyvalent metal salt may be, for example, in the range of about 50 to about 500 parts by weight, or about 100 to 400 parts by weight, or about 150 to 350 parts by weight, based on 100 parts by weight of the water-soluble organic solvent. If the amount of the polyvalent metal salt is within this range, the polyvalent metal salt may react with a colorant in ink and thus, the viscosity of ink is increased or ink may agglomerate and thus, a high image concentration may be obtained.

The cationic polymer may include at least one polymer selected from the group consisting of polyallylamine, polyamine sulfonate and polyallylamine salt.

The amount of the cationic polymer may be in the range of about 50 to about 500 parts by weight, or about 100 to 400 parts by weight, or about 150 to 350 parts by weight, based on 100 parts by weight of the water-soluble organic solvent. If the amount of the cationic polymer is within this range, image quality characteristics such as image concentration may be significantly improved, preservation stability and ejection stability of the coating solution may be improved, and corrosion of constituting components of the inkjet recording apparatus may be prevented.

According to another aspect of the present disclosure, a coating solution may further include known additives such as, e.g., a viscosity controller, a pH controller, a preservative, an antioxidant, an ultraviolet ray absorber, a photostabilizer, and/or an antifoaming agent.

According to another aspect of the present disclosure, the coating solution may have a viscosity of about 2.0 to about 19.9 cps, about 5 to about 17 cps, or about 7 to about 15 cps, at a temperature of, for example, 20° C. If the viscosity of the coating solution is within the above range, an appropriate liquid amount of the coating solution may be coated on the printing medium, thus resulting in a reduction in the likelihood of the concentration staining and in a high quality image.

According to another aspect of the present disclosure, an ink set may be provided to include a coating solution and an ink composition. The ink composition may include a colorant and a solvent. The colorant may be a dye or a pigment, and may be any material that is known in the art. By way of examples, the colorant may be selected from direct dye, acidic dye, eatable dye, alkali dye, reaction dye, dispersion dye, oil dye, various pigments, a self-dispersible pigment and a mixture thereof.

Among the colorants, examples of dyes may include, but are not limited to, food black dyes, food red dyes, food yellow dyes, food blue dyes, acid black dyes, acid red dyes, acid blue dyes, acid yellow dyes, direct black dyes, direct blue dyes, direct yellow dyes, anthraquinone dyes, monoazo dyes, disazo dyes, phthalocyanine deliveries, and the like. Examples of pigments may include, but are not limited to, carbon black, graphite, vitreous carbon, activated charcoal, activated carbon, anthraquinone, phthalocyanine blue, phthalocyanine green, diazos, monoazos, pyranthrones, perylene, quinacridone, indigoid pigments, and the like. Examples of self-dispersible pigments may include, but are not limited to, cabojet-series, CW-series of Orient Chemical, and the like.

The amount of the colorant may be, for example, in the range of about 1 to about 20 parts by weight, or about 2 to about 10 parts by weight, or about 3 to about 6 parts by weight, based on 100 parts by weight of the ink composition. If the amount of the colorant is within such range, the desired optical concentration may be obtained, and a significant increase in the viscosity may be realized, thus allowing an improvement in the inkjet ejection performance.

The disclosed solvent may include a water-soluble solvent such as, e.g., water. According to another aspect of the present disclosure, the solvent may further include at least one organic solvent. The solvent may be, for example, in the range of about 80 to about 99 parts by weight, about 83 to about 90 parts by weight, or about 85 to about 95 parts by weight, based on 100 parts by weight of the ink composition. If the amount of the solvent is within the above range, the viscosity and the surface tension of the ink composition can be appropriately controlled, and thus, a decrease in the ejection performance may be prevented.

The organic solvent included in the solvent may include at least one solvent selected from the group consisting of a monovalent alcohol-based solvent, a ketone-based solvent, an ester-based solvent, a polyhydric alcohol-based solvent, a nitrogen-containing solvent and sulfur-containing solvent.

Examples of monovalent alcohol-based solvents may include, but are not limited to, methyl alcohol, ethyl alcohol, n-propyl alcohol, isopropyl alcohol, n-butyl alcohol, sec-butyl alcohol, t-butyl alcohol, isobutyl alcohol, and the like. Examples of ketone-based solvents may include, but are not limited to, acetone, methylethylketone, diethylketone, diacetone alcohol, and the like. Examples of ester-based solvents may include, but are not limited to, methyl acetate, ethyl acetate, ethyl lactate, and the like. Examples of polyhydric alcohol-based solvents may include, but are not limited to, ethyleneglycol, diethyleneglycol, triethyleneglycol, propyleneglycol, butyleneglycol, 1,4-butanediol, 1,2,4-butanetriol, 1,5-pentanediol, 1,6-hexanediol, 1,2,6-hexantriol, hexyleneglycol, glycerol, glycerol ethoxylate, trimethylolpropane ethoxylate, and the like.

The disclosed monovalent alcohol used as the organic solvent may help control the surface tension of the ink, and may thus help control the intrusion characteristics of the ink, the dot forming ability of the ink and the drying characteristics of the printed image on a printing medium such as, e.g., paper. Such improved control may be realized when using paper for a normal purpose or paper for a special purpose. The polyhydric alcohol and derivatives thereof do not evaporate easily, and may lower the freezing point of the ink, thereby improving the preservation stability of the ink, and may thus reduce the clogging of the nozzles.

Examples of nitrogen-containing solvents may include, but are not limited to, 2-pyrrolidone, N-methyl-2-pyrrolidone, and the like. Examples of sulfur-containing solvents may include, but are not limited to, dimethyl sulfoxide, tetramethylenesulfone, thioglycol, and the like.

If the organic solvent may be used together with a water-soluble solvent such as, e.g., water. The amount of the organic solvent may be in the range of, for example, about 0.1 to about 130 parts by weight or about 10 to about 50 parts by weight, based on 100 parts by weight of the water. If the amount of the organic solvent is within the above range, an excessive increase in the surface tension and viscosity of ink may be prevented, and the ejection performance of the ink may thus be improved.

According to another aspect of the present disclosure, an ink composition may include various additives in order to enhance the characteristics of the ink composition. For example, the ink composition may further include at least one additive selected from the group consisting of a wetting agent, a dispersant, a surfactant, a viscosity controller, a pH controller and an antioxidant. The amount of the additive may be in the range of, for example, about 0.5 to about 600 parts by weight or about 10 to about 300 parts by weight, based on 100 parts by weight of the colorant. If the amount of the additive is within the above range, the additive may exhibit its desired performance, and the storage stability of the ink composition may thus be maintained.

Among these additives, the surfactant is not limited to any one type, and may be appropriately selected according to the intended application. Examples of surfactants may include, but are not limited to, a positive surfactant, an anionic surfactant, a cationic surfactant, a non-ionic surfactant, and the like. These surfactants may be used alone or in combination.

Examples of positive surfactants may include, but are not limited to, alanine, dodecyldi(aminoethyl)glycine, di(octylaminoethyl)glycine, N-alkyl-N,N-dimethylammoniumbetaine, and the like.

Examples of anionic surfactants may include, but are not limited to, alkylbenzene sulfonate, α-olefin sulfonate, polyoxyethylenealkylether acetate surfactant, ester phosphate, and the like.

Examples of cationic surfactants may include, but are not limited to, an amine salt type surfactant such as alkyl amine salt, aminoalcohol fatty acid derivative, polyamine fatty acid derivative, or imidazoline; and a tertiary ammonium salt type surfactant such as alkyltrimethyl ammonium salt, dialkyldimethyl ammonium salt, alkyldimethylbenzyl ammonium salt, pyridium salt, alkylisoquinolinium salt, or benzethonium chloride, and the like.

Examples of non-ionic surfactants may include, but are not limited to, polyoxyethylenealkylether surfactant, polyoxyethylenealkylphenylether surfactant, acetyleneglycol surfactant, and the like. Among these surfactants, the non-ionic surfactant has excellent antifoaming characteristics.

Examples of non-ionic surfactants may include, but are not limited to, SURFYNOL™ series having a structure of acetylenic ethoxylated diol (available from Air Products and Chemicals, Inc. of Allentown, Pa., U.S.A.), TERGITOL™ series having a structure of a polyethylene oxide or polypropylene oxide (available from Union Carbide Corp. of Houston, Tex., U.S.A.), Tween series having a structure of a polyoxyethylene sorbitan fatty acid ester (available from various sources, including, e.g., Sigma-Aldrich Co. of St. Lois, Mo., U.S.A.), and the like.

According to another aspect of the present disclosure, an ink composition may have an optimal use state when the surface tension of the ink composition at a temperature of 20° C. may be in the range of, for example, about 15 to about 70 dyne/cm or about 25 to about 55 dyne/cm, and when the viscosity of the ink composition at a temperature of 20° C. may be in the range of, for example, about 1 to about 20 cps, or about 1.5 to about 3.5 cps. If the surface tension of the ink composition is within the above range, the printing performance may be improved. If the viscosity of the ink composition is within the above range, a smooth ejection performance may be obtained.

Inkjet printing using the ink set may be performed by using the following methods. However, other methods known in the art may alternatively be used. For example, the ink composition may be used after the coating solution is applied onto a printing medium. Alternatively, the coating solution may be applied after the ink composition is used. Alternatively, the ink composition may be used, after which the coating solution may be applied, and then additional amount of ink composition may be used. Alternatively, the coating solution may be applied, after which the ink composition may be used, and then the coating solution may again be applied.

In this regard, the coating solution may be applied onto the printing medium by using the same method as used for an ink composition. For example, the coating solution may be applied by using an inkjet recording method or a coating method using a roller.

Unlike the inkjet recording method, the coating method using a roller may be performed regardless of ejection characteristics of the reaction solution, and may thus allow a uniform coating on the printing medium.

According to another aspect of the present disclosure, an inkjet recording apparatus may include an ink set. The inkjet recording apparatus may include a thermal head that ejects ink droplets by vapor pressure generated by heating, or a piezo head that ejects ink droplets by using a piezo device, and may include a disposable head, or a permanent head. The inkjet recording apparatus may be a scanning type printer or an array type printer, and may be used as an office or home desktop printer, textile printer, or in any other office, residential or industrial applications.

The head types, printer types, and usages of the inkjet recording apparatus identified above are examples provided in order to illustrate the broad range of types and applications for the inkjet recording apparatus according to one or more embodiments herein described. Accordingly, it should be understood that the inkjet recording apparatus according to the aspects of the present disclosure is not limited to any of such specific examples.

FIG. 1 is a schematic cross-sectional view of an inkjet recording apparatus according to an embodiment of the present disclosure. Referring to FIG. 1, the inkjet recording apparatus according to an embodiment may include a recording head 1, a sheet feeding cassette 16, a drive unit (not shown) for reciprocally driving a recording head in a direction orthogonal to the direction in which a printing medium 19 is conveyed, and a control unit (not shown) for controlling these elements.

The recording head 1 is mounted on a carriage 2 so that ink ejection ports therein face a platen 11. The carriage 2 may include an ink cartridge (not shown). The recording head 1 ejects ink composition droplets onto the printing medium 19 to form an image while being carried by the carriage 2 reciprocating along two guide shafts 9 extending in parallel along the width direction of the printing medium 19.

The sheet feeding cassette 16 may be detachable from the inkjet recording apparatus, and may include a sheet-feeding tray 17 on which the printing media 19 are stacked. During sheet feeding, the uppermost sheet of the printing media 19 is pressed against a sheet-feeding roller 10 by a spring 18 pressing the sheet-feeding tray 17 upward.

The inkjet recording apparatus may include a supply tank 22 for supplying a coating solution 15, a supply roller 13 rotatably supported so that a circumferential face thereof is partly dipped in the supply tank 22 and a coating roller 6 arranged in parallel to, and in contact with, the supply roller 13. The coating roller 6 may be configured to rotate in the same direction as the rotational direction of the supply roller 13. When a sheet of printing medium 19 is conveyed, the coating solution 15 is supplied to the circumferential surface of the coating roller 6 by the supply roller 13, and the coating solution 15 is applied onto the printing side(s) of the printing medium 19 by the coating roller 6 and the intermediate roller 12.

The printing medium 19 fed from the sheet feeding cassette 16 is conveyed along a guide surface 16A of the sheet feeding cassette 16 and a guide surface 27A of a paper guide 27 by the intermediate roller 12 and the coating roller 6 contacting the intermediate roller 12. The printing medium 19, to which the coating solution 15 has been applied by the coating roller 6 and the intermediate roller 12, may be fed further by the intermediate roller 12 toward the platen 11, and may be fed to move across the platen 11 by the feed rollers 3, 4, 7 and 8 so as to receive ink composition droplets from the recording head 1 as it moves across the platen 11. The printing medium 19 on which ink image has been formed by the recording head 1 is then collected in the printing medium output bin 5.

A float 14 may be placed in the supply tank 22. The float 14 has smaller specific gravity than the coating solution 15, thereby enabling the residual amount of the coating solution 15 to be visually checked through a level indication window 21.

Hereinafter, several specific embodiments of the present disclosure will be described in detail with reference to the following examples. These examples however, are not intended to limit the purpose and scope of the embodiments of the present disclosure.

EXAMPLES

For further illustration of various aspects of the present disclosure, several specific examples will now be described. It should be understood that these examples are for illustrative purposes only, and are not intended to limit the scope of the present disclosure.

Examples 1 to 4

Preparation of Coating Solution for Inkjet Recording Apparatus

Water in the amount shown in Table 1 was loaded into a reactor and lithium chloride, N,N-dimethylacetamide, polyethyleneglycol, calcium nitrate, a cationic polymer, a wetting agent, and a surfactant were sequentially added thereto in the amounts shown in Table 1. The mixture was stirred at a stirring rate of 500 to 600 rpm for 1 hour to prepare the coating solutions for an inkjet recording apparatus. In Table 1, the unit is parts by weight.

TABLE 1

|  | Example 1 | Example 2 | Example 3 | Example 4 |
| --- | --- | --- | --- | --- |
| N,N-dimethylacetamide | 10.02 | 22.30 | 5.51 | 0.99 |
| Polyethyleneglycol (Mw: 1540, Tanatex Co., Ltd) | 24.23 | 24.77 | 33.04 | 33.04 |
| Lithium chloride | 0.99 | 2.48 | 5.51 | 10.02 |
| Cationic polymer (polyamine, SNF Co., Ltd) | 13.22 | 13.51 | 13.22 | 13.22 |
| Calcium nitrate | 22.03 | 22.52 | 22.03 | 22.03 |
| Wetting agent (glycerin) | 48.46 | 38.29 | 39.65 | 39.65 |
| Surfactant (Surfynol465, Air Products and Chemicals, Inc.) | 1.32 | 1.32 | 1.32 | 1.32 |
| Water | 100 | 100 | 100 | 100 |

Comparative Examples 1 to 3

A coating solution for an inkjet recording apparatus was prepared in the same manner as in Examples 1 to 4 in the amounts shown in Table 2. In Table 2, the unit is parts by weight.

TABLE 2

|  | Comparative Example 1 | Comparative Example 2 | Comparative Example 3 |
|---|---|---|---|
| N,N-dimethylacetamide | 0 | 0 | 11.79 |
| Polyethyleneglycol (Mw: 1540, Tanatex Co., Ltd.) | 23.21 | 25.94 | 23.58 |
| Lithium chloride | 0 | 11.79 | 0 |
| Cationic polymer (polyamine, SNF Co., Ltd.) | 12.66 | 14.15 | 14.15 |
| Calcium nitrate | 21.1 | 23.58 | 23.58 |
| Wetting agent (glycerin) | 52.74 | 58.96 | 58.96 |
| Surfactant (Surfyno1465, Air Products and Chemicals, Inc.) | 1.27 | 1.42 | 1.42 |
| Water | 100 | 100 | 100 |

Evaluation: Curling Test

Preparation Examples 1 and 2

Preparation of Ink Composition

In each experiment, a colorant, water, an organic solvent and an additive were mixed in the amounts as shown below, and the resulting mixture was sufficiently stirred for at least 30 minutes to obtain a homogeneous solution. The resultant solution was passed through a 0.45 μm filter, thereby preparing ink compositions of Preparation Examples 1-1 to 1-4.

Preparation Example 1

| Yellow Colorant (PY-74) | 4.5 parts by weight |
|---|---|
| Glycerol | 6.9 parts by weight |
| Diethyleneglycol | 8 parts by weight |
| Non-ionic surfactant (surfyno1465, Air Products and Chemicals, Inc.) | 0.6 parts by weight |
| Water (deionized water) | 80 parts by weight |

Preparation Example 2

| Cyan colorant (PB 15:4) | 4.5 parts by weight |
|---|---|
| Glycerol | 6.9 parts by weight |
| Diethyleneglycol | 8 parts by weight |
| Non-ionic surfactant (surfyno1465, Air Products and Chemicals, Inc.) | 0.6 parts by weight |
| Water (deionized water) | 80 parts by weight |

Curling Test 1

A printing medium (a sheet of premium printing paper available from Samsung Electronics Co. Ltd.) was fed to an inkjet printer employing the coating solutions prepared according to Examples 1 to 4 and the ink compositions prepared according to Preparation Examples 1 to 2. Pre-coating was performed using the coating solution and the ink composition was completely printed on the printing medium. The resultant printing medium was left to sit for 24 hours at a temperature of 25° C. and in a relative humidity of 50%. The curling degree of the printing medium was evaluated by measuring the height of each corner of the printing medium, and the evaluated heights were averaged. The results are shown in Table 3. In Table 3, the unit is mm.

TABLE 3

|  | Coating Solution | | | |
|---|---|---|---|---|
| Ink Composition | Example 1 | Example 2 | Example 3 | Example 4 |
| Preparation Example 1 | 11 | 12 | 9 | 10 |
| Preparation Example 2 | 12 | 10 | 9 | 13 |

Curling Test 2

The curling degree was evaluated in the same manner as in Curling Test 1, except that an inkjet printer employing the coating solutions prepared according to Comparative Examples 1 to 3 and the ink composition prepared according to Preparation Examples 1 to 2 was used. The results are shown in Table 4. In Table 4, the unit is mm.

TABLE 4

|  | Coating solution | | |
|---|---|---|---|
| Ink composition | Comparative Example 1 | Comparative Example 2 | Comparative Example 3 |
| Preparation Example 1 | 46 | 38 | 35 |
| Preparation Example 2 | 41 | 44 | 36 |

As shown in Tables 3 and 4, when the coating solutions of Examples 1 to 4 including the non-ionic polymer; the monovalent metal salt and the water-soluble organic solvent were used, the curling degree after printing was substantially decreased compared to the case when the coating solutions of Comparative Examples 1 to 3 including only some of the non-ionic polymer, the monovalent metal salt and the water-soluble organic solvent were used.

While the present disclosure has been particularly shown and described with reference to several embodiments thereof, it will be understood by those of ordinary skill in the art that various changes in form and details may be made thereto without departing from the principles and spirit of the present disclosure, the proper scope of which is defined in the following claims and their equivalents.

What is claimed is:

1. A coating solution for an inkjet recording apparatus, comprising a non-ionic polymer, a monovalent metal salt, polyvalent metal salt, a cationic polymer and a water-soluble organic solvent capable of forming a hydrogen bond with the monovalent metal salt.

2. The coating solution of claim 1, wherein the non-ionic polymer comprises at least one polymer selected from the group consisting of polyacryl amide, polyvinyl pyrrolidone, water-soluble celluloses, polyvinyl methyl ether, polyvinyl acetal, polyvinyl alcohol and polyalkylene glycol.

3. The coating solution of claim 1, wherein the monovalent metal salt comprises at least one metal salt selected from salts comprising a monovalent metallic ion and an anionic ion, wherein the monovalent metallic ion is $Li^{+1}$, $Na^{+1}$, or $K^{+1}$; and wherein the anionic ion is $Cl^{-1}$, $NO^{-3}$, $I^{-1}$, $Br^{-1}$, $ClO^{-3}$, $HCOO^{-1}$, $CH_3COO^{-1}$, $OH^{-1}$, $F^{-1}$, $CO_3^{-2}$, $SO_4^{-2}$, $SO_3^{-2}$, $C_6H_5CO^{-2}$, or $HOC(COO^{-1})(CH_2COO^{-1})_2$.

4. The coating solution of claim 1, wherein the monovalent metal salt comprises at least one salt selected from the group consisting of lithium chloride, sodium chloride, potassium chloride, sodium bromide, potassium bromide, sodium iodide, potassium iodide, sodium sulfate, potassium nitride, sodium acetate, potassium hydroxide, sodium citrate and potassium benzoic acid.

5. The coating solution of claim 1, wherein the water-soluble organic solvent comprises at least one solvent selected from the group consisting of an amide-based solvent, a nitrogen-containing solvent and a sulfur-containing solvent.

6. The coating solution of claim 1, wherein the water-soluble organic solvent comprises at least one solvent selected from the group consisting of N,N-dimethyl acetamide, N,N-dimethyl formamide, pyrrolidone, N-methyl-2-pyrrolidone, 1,3-dimethyl-2-imidazolidinone, dimethylsulfoxide, diethylsulfoxide, tetramethylenesulfone and sulpholane.

7. The coating solution of claim 1, wherein the amount of the non-ionic polymer is in the range of about 100 to about 1,000 parts by weight based on 100 parts by weight of the water-soluble organic solvent; and
wherein the amount of the monovalent metal salt is in the range of about 10 to about 100 parts by weight, based on 100 parts by weight of the water-soluble organic solvent.

8. The coating solution of claim 1, wherein the polyvalent metal salt comprises at least one salt selected from salts comprising a polyvalent metallic ion and an anionic ion,
wherein the polyvalent metallic ion is $Ca^{+2}$, $Cu^{+2}$, $Ni^{+2}$, $Mg^{+2}$, $Zn^{+2}$, $Sr^{+2}$, $Ba^{+2}$, $Al^{+3}$, $Fe^{+3}$, $Cr^{+3}$, or $Y^{+3}$; and
wherein the anionic ion is $Cl^{-1}$, $NO^{-3}$, $Br^{-1}$, $ClO^{-3}$, $HCOO^{-1}$, $CH_3COO^{-1}$, $OH^{-1}$, $F^{-1}$, $CO_3^{-2}$, $SO_4^{-2}$, $SO_3^{-2}$, $C_6H_5CO^{-2}$, or $HOC(COO^{-1})(CH_2COO^{-1})2$.

9. The coating solution of claim 1, wherein the polyvalent metal salt is aluminum chloride, aluminum bromide, aluminum sulfate, aluminum nitrate, aluminum acetate, calcium chloride, calcium bromide, calcium iodide, calcium acetate, calcium benzoate, calcium sulfate, copper chloride, copper bromide, copper sulfate, iron chloride, iron bromide, iron iodide, iron sulfate, iron acetate, magnesium chloride, magnesium sulfate, manganese chloride, manganese sulfate, manganese nitrate, nickel chloride, nickel bromide, nickel sulfate, nickel acetate, nickel nitrate, tin sulfate, titanium chloride, zinc chloride, zinc sulfate, zinc nitrate, barium chloride, or barium bromide.

10. The coating solution of claim 1, wherein the cationic polymer comprises at least one polymer selected from the group consisting of polyallylamine, polyamine sulfonate and polyallylamine salt.

11. The coating solution of claim 1, wherein the amount of the polyvalent metal salt is in the range of about 50 to about 500 parts by weight based on 100 parts by weight of the water-soluble organic solvent; and
wherein the amount of the cationic polymer is in the range of about 50 to about 500 parts by weight based on 100 parts by weight of the water-soluble organic solvent.

12. The coating solution of claim 1, wherein the viscosity of the coating solution is in the range of about 2.0 to about 19.9 cps at a temperature of 20° C.

13. An ink set comprising the coating solution of claim 1 and an ink composition.

14. The ink set of claim 13, wherein the ink composition comprises about 1 to about 20 parts by weight of a colorant and about 80 to about 99 parts by weight of a solvent.

15. The ink set of claim 14, wherein the solvent comprises water alone; or water and at least one organic solvent selected from the group consisting of a monovalent alcohol-based solvent, a ketone-based solvent, an ester-based solvent, a polyhydric alcohol-based solvent, a nitrogen-containing solvent and a sulfur-containing solvent.

16. The ink set of claim 13, wherein the surface tension of the ink composition is in the range of about 15 to about 70 dyne/cm at a temperature of 20° C., and
wherein the viscosity of the ink composition is in the range of about 1 to about 20 cps at a temperature of 20° C.

17. An inkjet recording apparatus comprising the ink set of claim 13.

* * * * *

UNITED STATES PATENT AND TRADEMARK OFFICE
CERTIFICATE OF CORRECTION

PATENT NO. : 8,314,171 B2  Page 1 of 1
APPLICATION NO. : 12/694853
DATED : November 20, 2012
INVENTOR(S) : Sung-Hui Park It is certified that error appears in the above-identified patent and that said Letters Patent is hereby corrected as shown below:

In the Claims

Column 13, Line 31, In Claim 8, delete "$NO^{-3}$, $Br^{-1}$" and insert -- $NO^{-3}$, $I^{-1}$, $Br^{-1}$ --, therefor.
Column 13, Line 33, In Claim 8, delete "$(CH_2COO^{-1})2.$" and insert -- $(CH_2COO^{-1})_2.$ --, therefor.

Signed and Sealed this
Fourteenth Day of May, 2013

Teresa Stanek Rea
*Acting Director of the United States Patent and Trademark Office*